United States Patent
Howell et al.

(10) Patent No.: US 6,944,387 B2
(45) Date of Patent: Sep. 13, 2005

(54) FIBER OPTIC CONNECTOR TRAY SYSTEM

(75) Inventors: Bret L. Howell, Newman Lake, WA (US); Paul N. Poshusta, Spokane, WA (US)

(73) Assignee: Telect, Inc., Liberty Lake, WA (US)

( * ) Notice: Subject to any disclaimer, the term of this patent is extended or adjusted under 35 U.S.C. 154(b) by 256 days.

(21) Appl. No.: 09/845,782

(22) Filed: Apr. 30, 2001

(65) Prior Publication Data

US 2002/0159745 A1 Oct. 31, 2002

(51) Int. Cl.$^7$ .................................. G02B 6/00
(52) U.S. Cl. ........................... 385/135; 385/53
(58) Field of Search .................. 385/135, 53–56, 385/76

(56) References Cited

U.S. PATENT DOCUMENTS

| | | |
|---|---|---|
| 4,373,776 A | 2/1983 | Purdy |
| 4,679,896 A | 7/1987 | Krafcik et al. |
| 4,792,203 A | 12/1988 | Nelson et al. |
| 4,824,196 A | 4/1989 | Bylander |
| 4,840,449 A | 6/1989 | Ghandeharizadeh |
| 4,900,123 A | 2/1990 | Barlow et al. |
| 4,911,521 A | 3/1990 | Ryuto et al. |
| 5,052,775 A | 10/1991 | Bossard et al. |
| 5,097,529 A * | 3/1992 | Cobb et al. ............. 385/135 |
| 5,119,459 A | 6/1992 | Meyerhoefer et al. |
| 5,123,071 A * | 6/1992 | Mulholland et al. ........ 385/53 |
| 5,127,082 A | 6/1992 | Below et al. |
| 5,142,606 A | 8/1992 | Carney et al. |
| 5,167,001 A | 11/1992 | Debortoli et al. |
| 5,212,761 A | 5/1993 | Petrunia |
| 5,323,478 A | 6/1994 | Milanowski et al. |
| 5,363,467 A | 11/1994 | Keith |
| 5,428,705 A | 6/1995 | Hermsen et al. |
| 5,430,823 A | 7/1995 | Dupont et al. |
| 5,450,518 A | 9/1995 | Burek et al. |
| 5,490,229 A | 2/1996 | Ghandeharizadeh et al. |
| 5,511,144 A | 4/1996 | Hawkins et al. |
| 5,542,015 A * | 7/1996 | Hultermans ................ 385/60 |
| 5,553,180 A * | 9/1996 | Belenkiy et al. ........... 385/59 |
| 5,617,501 A | 4/1997 | Miller et al. |
| 5,689,605 A | 11/1997 | Cobb et al. |
| 5,713,755 A * | 2/1998 | Koopman et al. ........... 439/378 |
| 5,734,775 A | 3/1998 | Vidacovich et al. |
| 5,778,131 A | 7/1998 | Llewellyn et al. |
| 5,802,237 A | 9/1998 | Pulido |
| 5,804,765 A | 9/1998 | Siemon et al. |
| 5,835,657 A | 11/1998 | Suarez et al. |
| 5,835,660 A * | 11/1998 | Jung et al. ................ 385/137 |
| 5,870,519 A | 2/1999 | Jenkins et al. |
| 5,887,106 A | 3/1999 | Cheeseman et al. |
| 5,946,440 A | 8/1999 | Puetz |
| 5,987,207 A | 11/1999 | Hoke |

(Continued)

FOREIGN PATENT DOCUMENTS

| | | |
|---|---|---|
| WO | 95/29418 | 11/1995 |
| WO | 98/13713 | 4/1998 |
| WO | 99/38042 | 7/1999 |
| WO | 99/42881 | 8/1999 |

*Primary Examiner*—Hae Moon Hyeon
(74) *Attorney, Agent, or Firm*—Wells St. John P.S.

(57) ABSTRACT

A fiber optic cable connector tray system with a tray framework with a first end, a second end, a first side and a second side, a plurality of fiber optic cable adapter holders mounted to the tray framework such that fiber optic connectors therein would be in a generally transverse orientation from the first side to the second side of the tray framework, the plurality of fiber optic cable adapter holders each having a first adapter mount area configured to receive a first adapter; a second adapter mount area configured to receive a second adapter; and a fiber optic cable passageway between the first adapter mount area and the second adapter mount.

27 Claims, 8 Drawing Sheets

U.S. PATENT DOCUMENTS

| | | |
|---|---|---|
| 6,009,224 A | 12/1999 | Allen |
| 6,009,225 A | 12/1999 | Ray et al. |
| 6,061,492 A | 5/2000 | Strause et al. |
| 6,081,645 A | 6/2000 | Dotzer et al. |
| 6,215,938 B1 | 4/2001 | Reitmeier et al. |
| 6,227,718 B1 * | 5/2001 | Harvey et al. ............... 385/55 |
| 6,443,627 B1 * | 9/2002 | Anderson et al. ............ 385/56 |
| 6,466,724 B1 * | 10/2002 | Glover et al. ............... 385/135 |
| 6,644,866 B1 * | 11/2003 | Kusuda et al. ............... 385/88 |

* cited by examiner

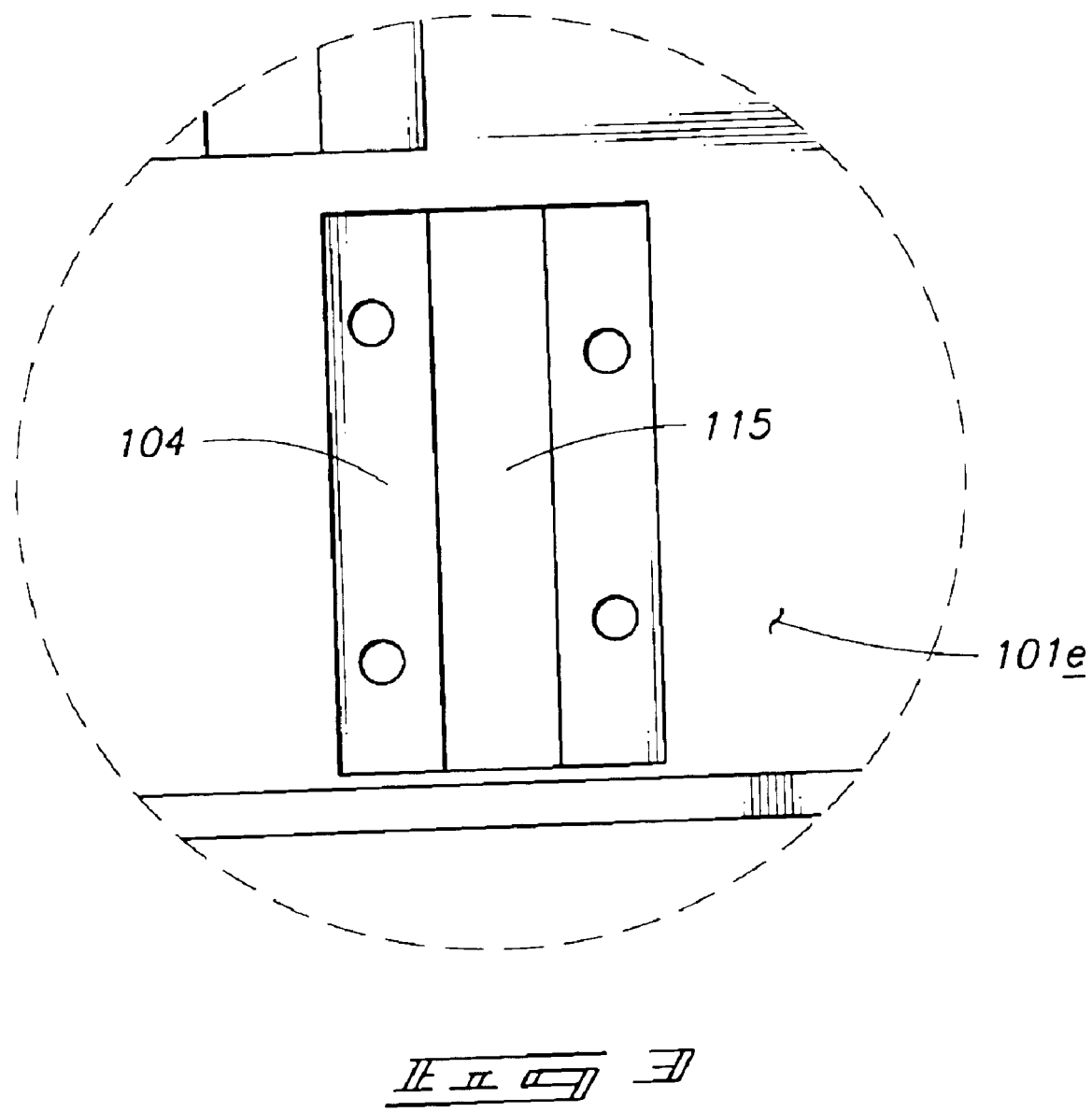

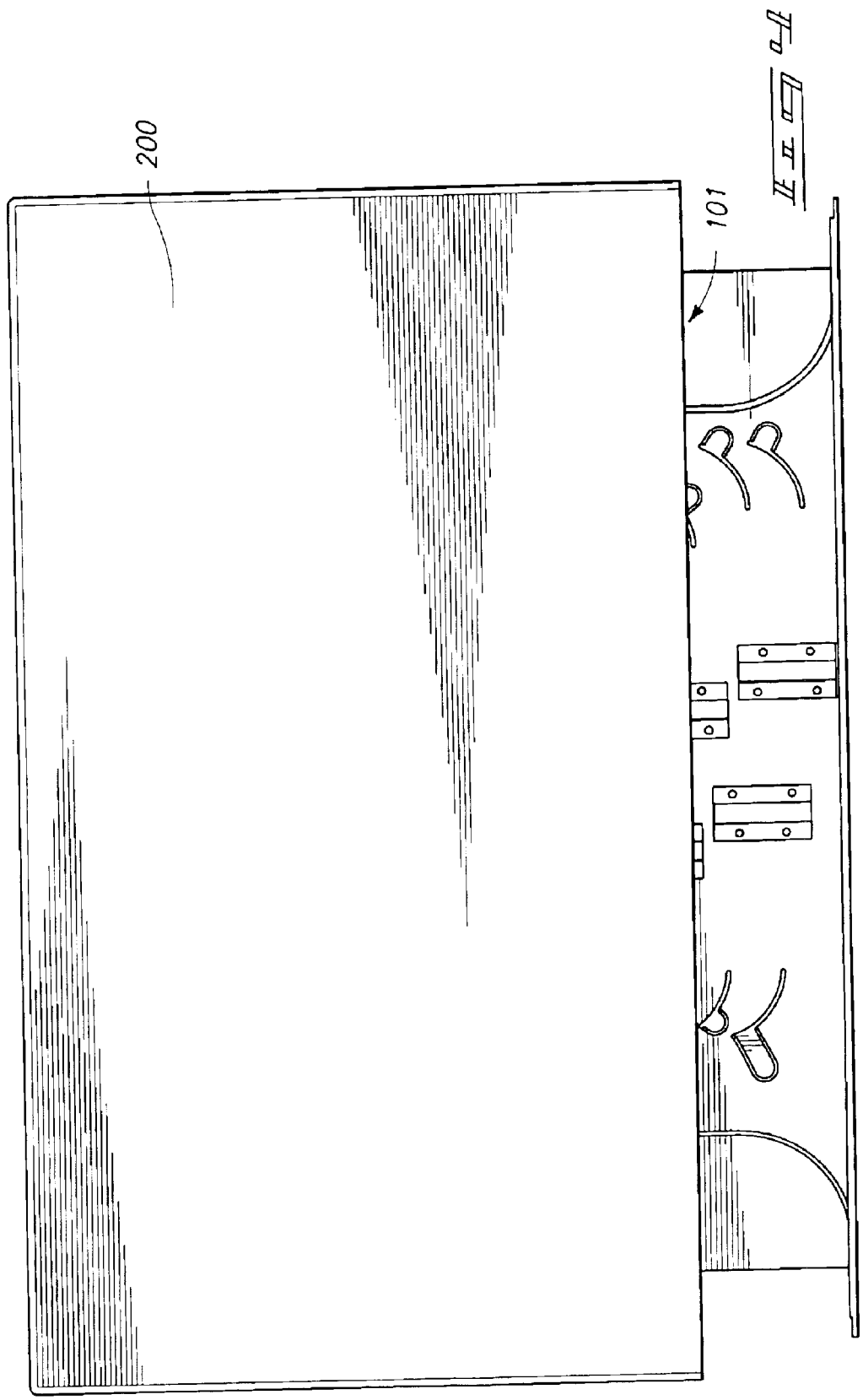

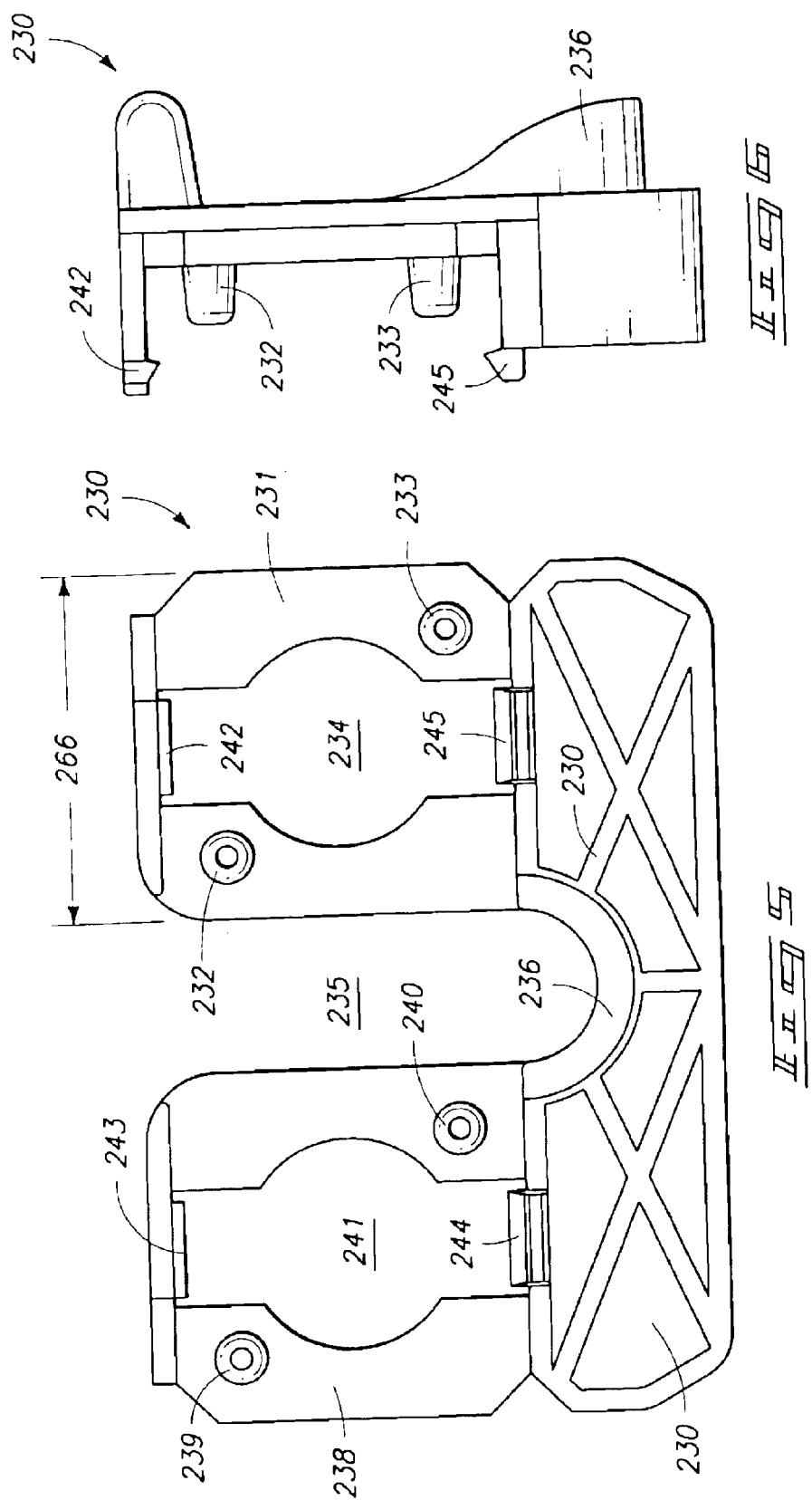

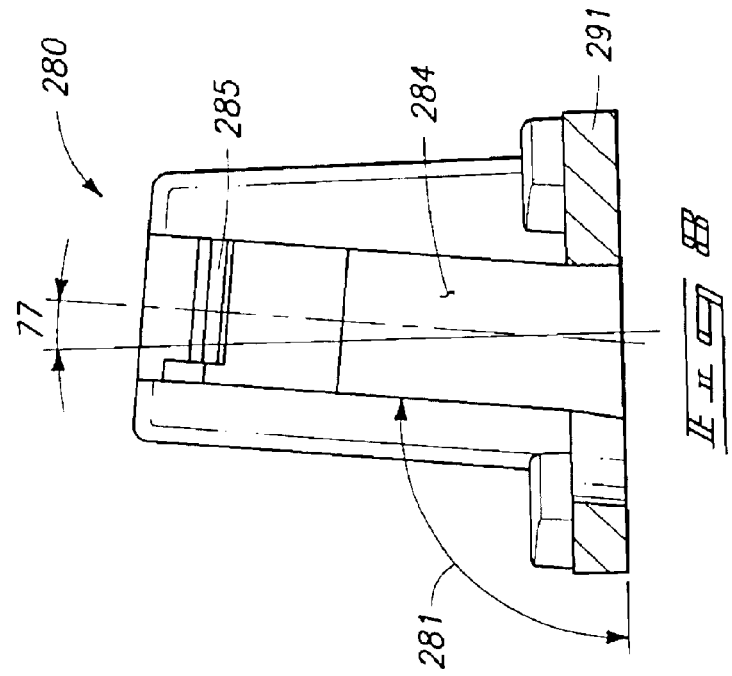
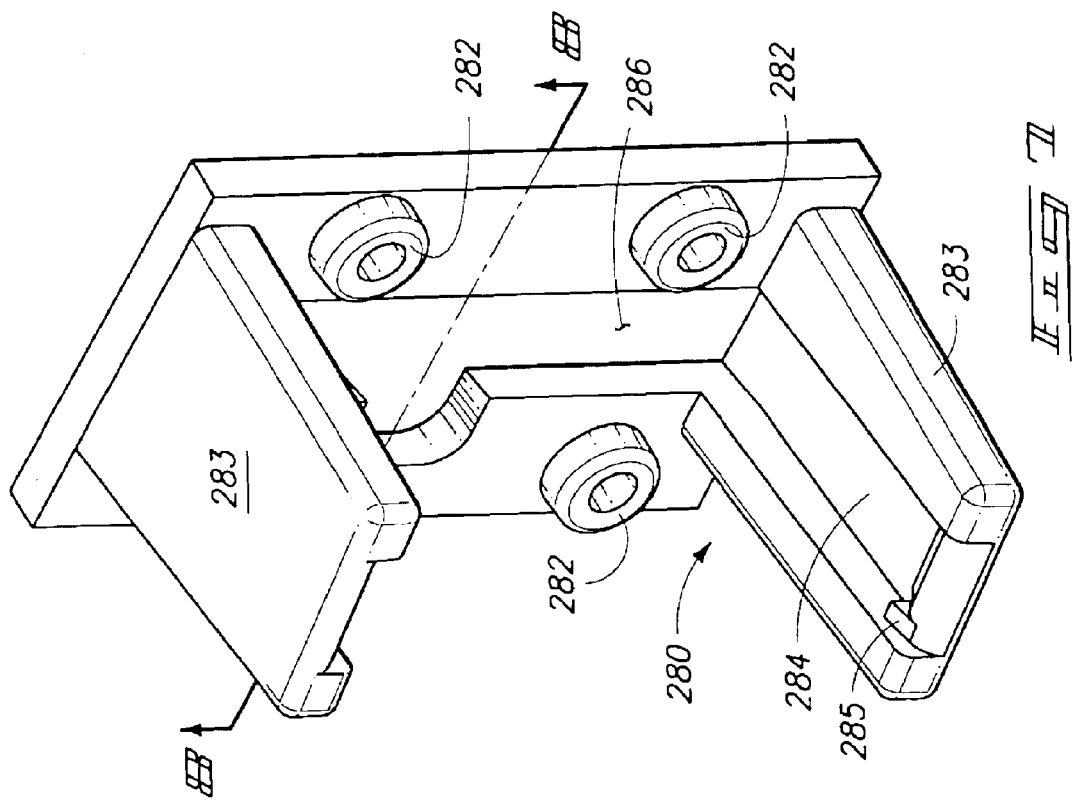

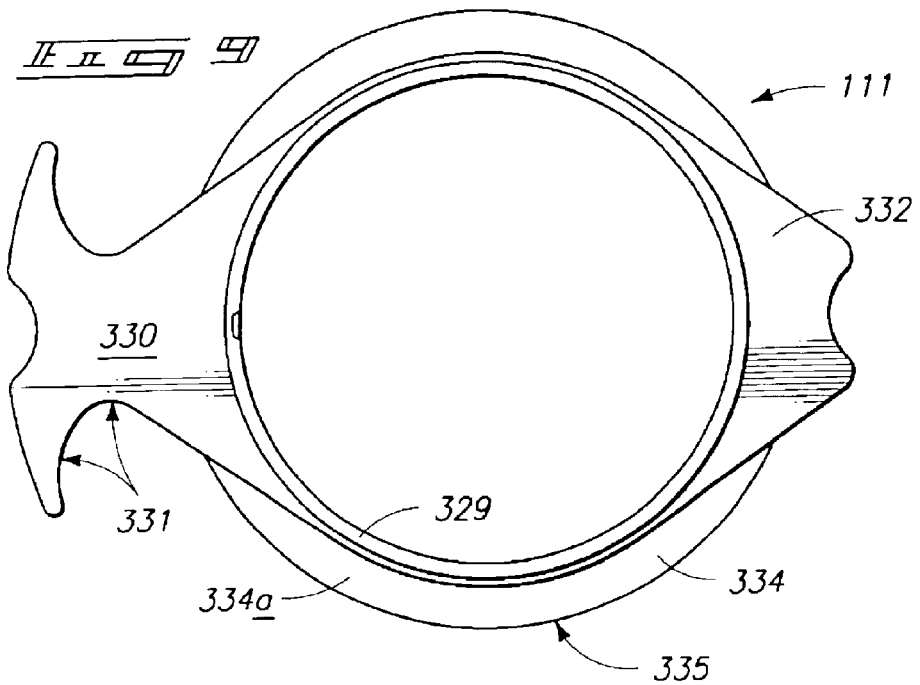
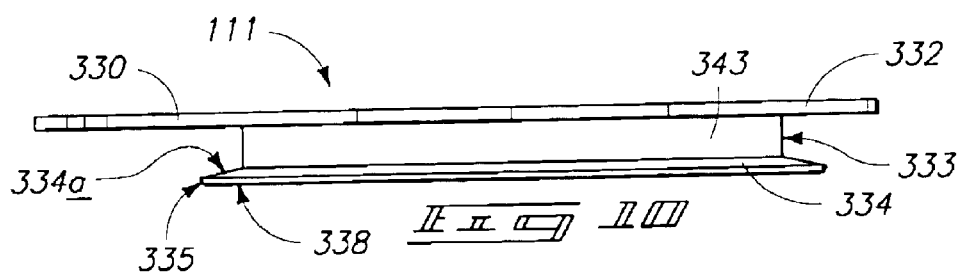
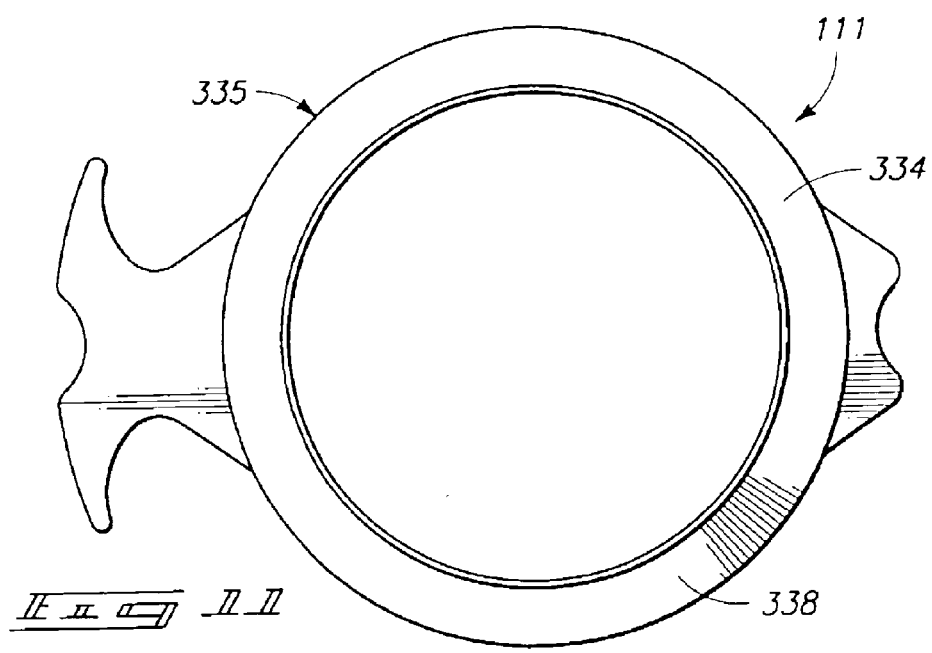

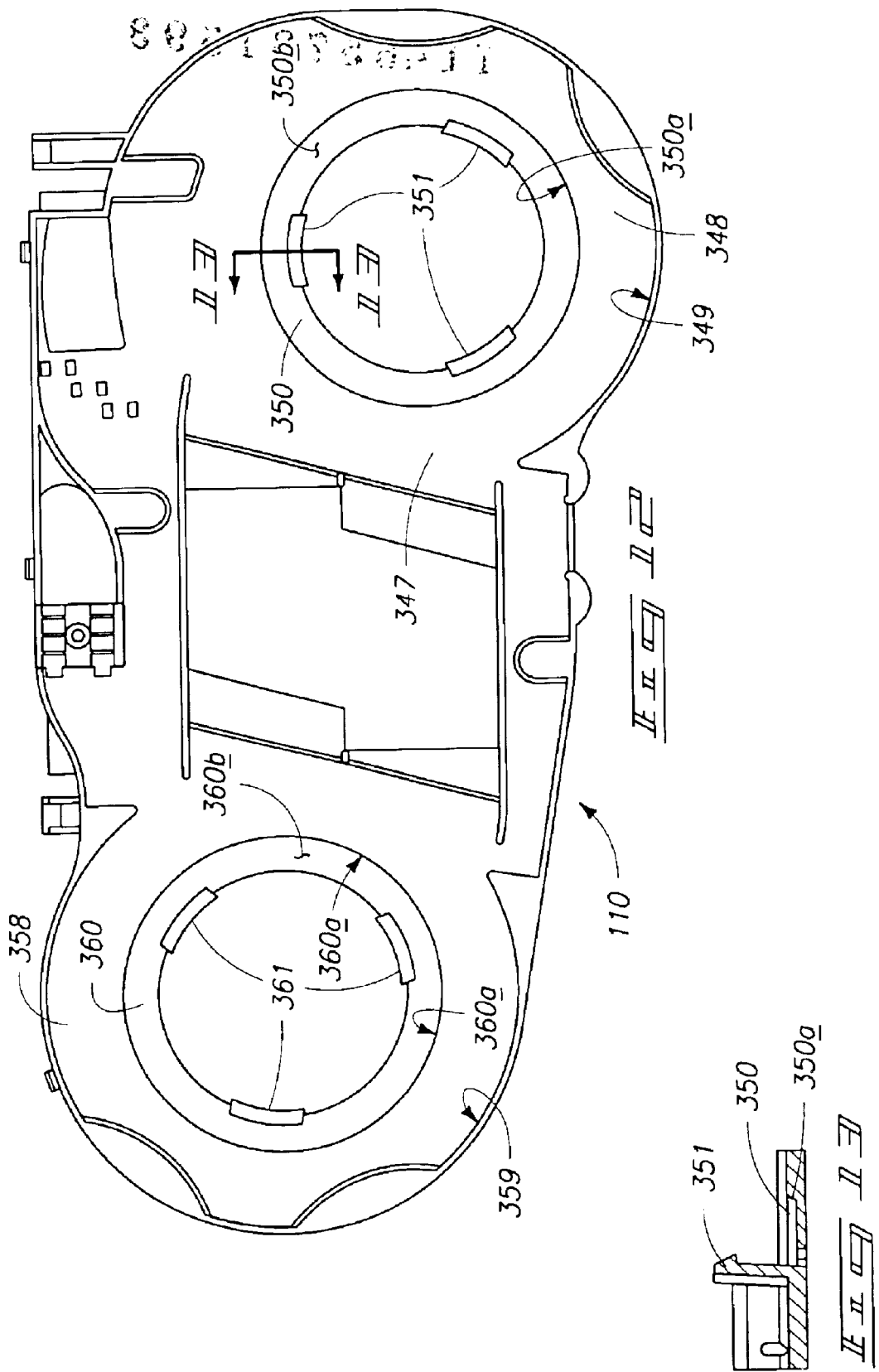

FIBER OPTIC CONNECTOR TRAY SYSTEM

TECHNICAL FIELD

This invention pertains to fiber optic connector tray system primarily for use in telecommunications facilities, more particularly, a fiber optic connector tray system which includes a high density of adapter holders and a high density of fiber optic cable adapters and connectors with and without a storage area and/or a splice housing.

BACKGROUND OF THE INVENTION

With the large increase in demand for telecommunications capacity, there is an increasing need for greater density and capacity in all areas of telecommunications, including signal transmission, connections or cross-connections, and terminations. The better utilization of a given amount of space in telecommunications facilities is becoming more and more important.

In many facilities there are bays or racks in which different types of cabinets and other equipment are mounted. Generally a telecommunication fiber optic cable distribution bay or panel is located in the central office of a telephone system or at a remote location near a customer's premises. The purpose of the distribution bay, panel and/or cabinet is to provide termination, cross-connect, splice, patch and storage interface between fiber-optic cables that lead to user installations.

These bays typically include multiple cabinets and/or trays that have fiber-optic splice cable storage, splice, cross connection and/or patching functions or features. Normally the trays are maintained in the retracted storage position during normal operations and are pulled or moved outward in an extended position when access is desired for installation, repair, monitoring, patching, maintenance or reconnecting.

Because of the very delicate and exacting nature of optical fibers, it is important that the individual fibers not be overly bent, or unduly stressed, in the distribution system, otherwise the transmission effectiveness and efficiency may be compromised. Consequently, consideration must be given in the design, construction and operation of the trays so that the fiber-optic cables are not subjected to compromising bends or stresses.

An example of a prior telecommunication fiber-optic cable distribution apparatus is disclosed in U.S. Pat. No. 5,339,379, owned by Telect, Inc., which is hereby incorporated by this reference.

In certain instances it is desirable to isolate and easily access one circuit at a time, such as when connecting different fiber optic cables to the adapters. One circuit typically would include two fiber optic adapters.

While it is desirable to maximize the density or number of fiber optic cables which are patched or cross-connected in any given tray, this must be balanced by the ability or ease of access by the operator to individual cables or circuits and the protection of the fiber optic cables, including maintaining minimum bend radius.

In the management of fiber optic cables, it is important to maintain a minimum bend radius to protect the fiber optic cables. Two typical minimum bend radii for example are one and one-half inches, or thirty millimeters (30 mm).

It is an object of this invention to provide a fiber optic connector, patch or cross-connect framework or bulkhead which allows more fiber optic connectors to be mounted in the same area, but which are also easily accessible in a desirable way by the operator.

BRIEF DESCRIPTION OF THE DRAWINGS

Preferred embodiments of the invention are described below with reference to the following accompanying drawings.

FIG. 3 is a detail view of an aperture in the tray framework adjacent where an adapter holder is mounted on the tray framework, in the embodiment of the invention illustrated in FIG. 1;

FIG. 4 is a top view of the embodiment of the invention illustrated in FIG. 1 showing the tray partially slid into a cabinet;

FIG. 5 is a front elevation view of one embodiment of an adapter holder for an FC-type adapter as contemplated by this invention;

FIG. 6 is a side view of the adapter holder illustrated in FIG. 5;

FIG. 7 is a perspective view of one embodiment of an adapter holder recipient structure as contemplated by this invention;

FIG. 8 is a side cross-section view of the adapter holder recipient structure shown in FIG. 7;

FIG. 9 is a top view of one embodiment of a spool which may be used in the fiber optic cable bend radius protection system as contemplated by this invention;

FIG. 10 is an elevation view of the embodiment of a spool which may be used in the fiber optic cable bend radius protection system illustrated in FIG. 9;

FIG. 11 is a bottom view of a spool which may be used in the fiber optic cable bend radius protection system illustrated in FIG. 9;

FIG. 12 is a top view of one example of a splice housing which may be used as part of this invention;

FIG. 13 is view 13—13 from FIG. 12 and illustrates one of numerous potential ways to impart a bias force on the guide framework of the fiber optic cable bend radius protection system;

DETAILED DESCRIPTION OF THE PREFERRED EMBODIMENT(S)

Figure 1:
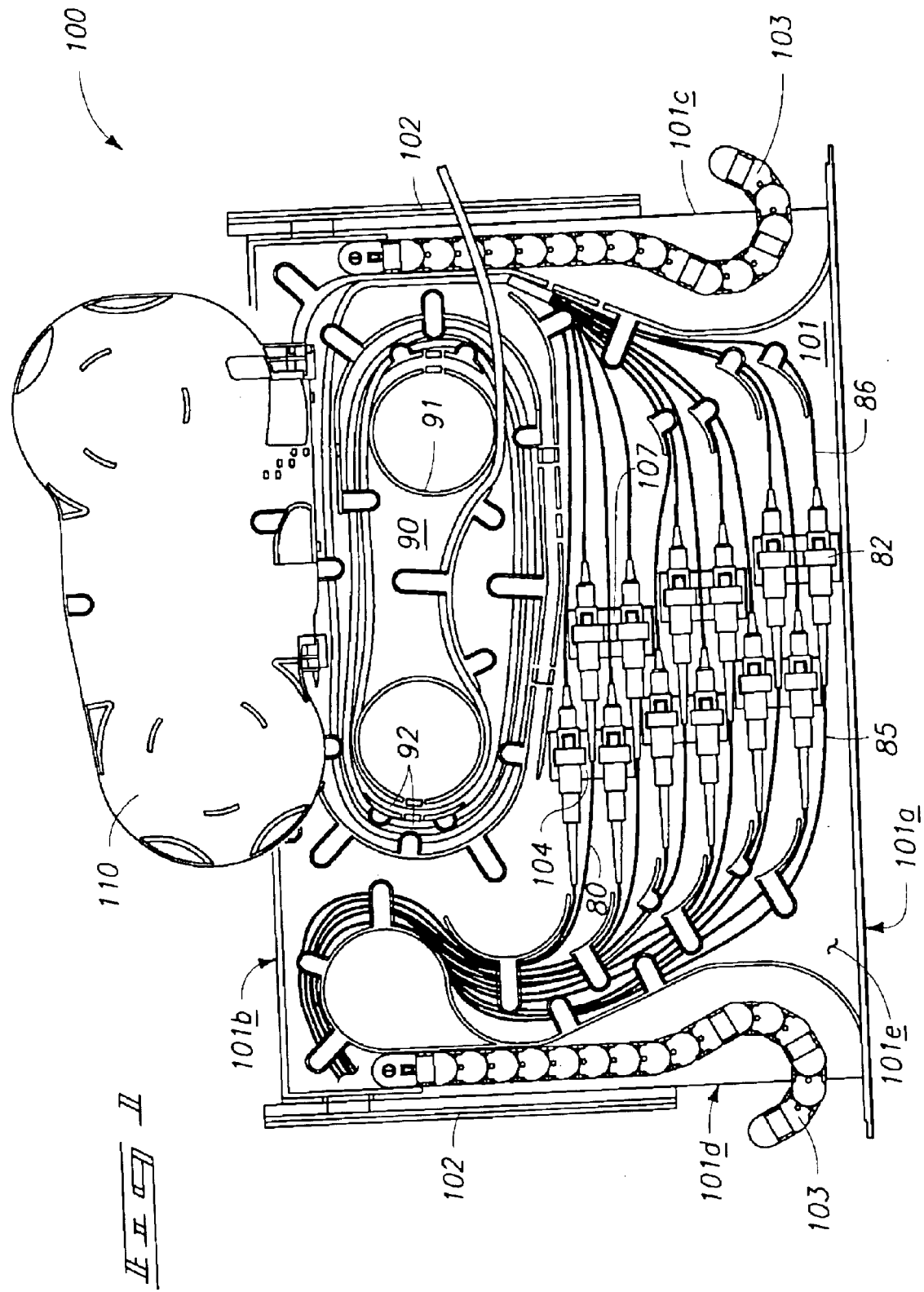
FIG. 1 is a top view of one embodiment of a fiber optic cable connector tray system as contemplated by this invention shown loaded with adapter holders and fiber optic cables attached to fiber optic cable connectors.

Many of the fastening, connection, manufacturing and other means and components utilized in this invention are widely known and used in the field of the invention described, and their exact nature or type is not necessary for an understanding and use of the invention by a person skilled in the art or science; therefore, they will not be discussed in significant detail. Furthermore, the various components shown or described herein for any specific application of this invention can be varied or altered as anticipated by this invention and the practice of a specific application or embodiment of any element may already be widely known or used in the art or by persons skilled in the art or science; therefore, each will not be discussed in significant detail.

The terms "a", "an", and "the" as used in the claims herein are used in conformance with long-standing claim drafting practice and not in a limiting way. Unless specifically set forth herein, the terms "a", "an", and "the" are not limited to one of such elements, but instead mean "at least one".

The term "generally oriented", such as when used in the context of generally oriented from the first side to the second side of the tray framework, not only means longitudinally aligned between the two sides or transverse in general to the tray shown, but also angles up to and including a forty-five degree angle from a perpendicular line between the two sides.

The term "connector" as used herein is well known and defined in the art, and is intended to broadly cover all types and kinds of connectors, past and future, no one of which is necessary to practice this invention. Generally a connector is a mechanical device used to align and join two fiber optic cables together to provide a means to attach and decouple it to transmitters, receivers or to another fiber optic cable. Commonly used connectors are, without limitation, ST Connector-Compatible connectors, FC-Type, FCPC, Biconic, SC, SC-Angled, E2000, E2000-Angled, D4, and SMA 905 or 906 connectors.

The term "adapter" as used herein is also well known and defined in the art, and is the apparatus which retains the fiber optic connectors and provides the structure to hold the fiber optic connectors and to mount the connectors to other equipment, panels, bulkheads, frameworks, and the like. "Adapter" is sometimes also referred to as a coupling or mating bushing in the industry and is also referred to as ST Connector-Compatible connectors, FC-Type, FCPC, Biconic, SC, SC-Angled, E2000, E2000-Angled, D4, and SMA 905 or 906 adapters.

The term "tray" or "tray framework" as used herein is intended to include trays or tray frameworks that slide, pivot, or both, to allow better access to the components mounted on or to the tray or framework. The tray or tray framework may or may not have side walls, a front wall or a rear wall.

The terms "adapter holder" or "adapter holding structure" as used herein, mean a structure, receiver, retainer or framework to which a fiber optic cable adapter may be mounted or attached, such as an FC-type or other type of adapter, as shown more fully in the drawings and described below. The adapter holder will need to be differently sized or configured depending on the type of adapter mounted thereon, according to the geometry of the adapter.

The term "latch" as used herein means and includes, without limitation, a resilient member and/or a non-resilient member which secures or attaches the fiber optic cable adapters to the adapter mount areas of the adapter holder.

Figure 2:
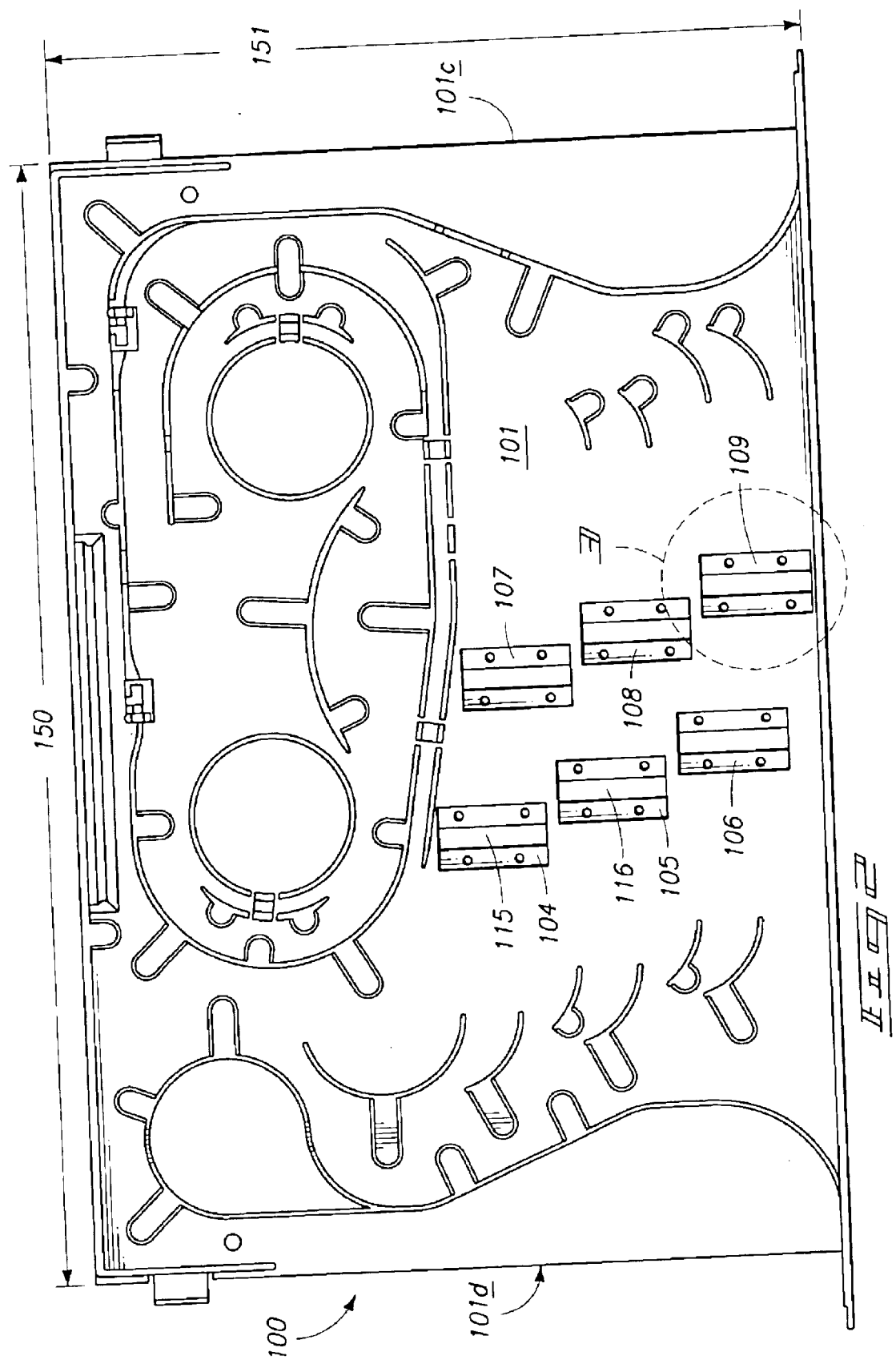
FIG. 2 is a top view of the embodiment of this invention illustrated in FIG. 1, only shown unloaded.

FIG. 1 illustrates one embodiment of a tray system 100 as contemplated by this invention, showing tray framework 101 with front end 101*a* or first end, second end 101*b* or rear end, first side 101*c* and second side 101*d*. The base bulkhead or surface 101*e* of tray framework 101 may serve as a structure upon which to mount other components. FIG. 2 better illustrates a plurality of fiber optic cable adapter holder recipient structures 104, 105, 106, 107, 108 and 109 mounted on the tray framework. The apertures in the base or framework (shown in FIG. 2) allow adapter holders which are inserted into adapter holder recipient structures to be accessed from the lower side of the tray framework to allow the adapter holders to be slid upward more easily.

Fiber optic cable management and bend radius protection guides 103 are provided on the sides of the tray framework for routing of fiber optic cables into or out of either side of the tray system, as shown in FIG. 1. The height of the tray is preferably approximately 1.75 inches in a preferred embodiment, a unit of measure which is sometimes generally referred to as a "rack unit". A typical industry standard size tray would fit into a 19-inch rack and would be approximately 12 inches deep, 1.75 inches tall for one rack unit tray. The tray would be slightly less than the width of the rack to facilitate mounting.

If the tray framework is slidably mounted within a cabinet, as contemplated by some embodiments of this invention, it would be slidably mounted via slide rails 102, as shown in FIG. 1.

When fiber optic adapter holders are mounted within the fiber optic adapter holder recipient structures, they will be generally oriented from the front end 101*a* (also the first end) to the rear end 101*b* (also the second end) i.e. longitudinally, which generally orients adapters, connectors and fiber optic cables from the first side to the second side of the tray framework, or transversely. Toward the second end 101*b* or rear of the tray framework is an area where various desired functions or operations may be accomplished, such as storage or splicing of fiber optic cables in the tray.

In order to facilitate a denser fiber optic cable arrangement, a splice housing 110 (or in other embodiments, a storage housing), may be pivotally mounted to the tray framework 101 such that storage and/or splice functions may be accomplished at two levels, the first within the splice housing 110 and the second below the splice housing (as shown in FIG. 2).

FIG. 1 shows a tray fully loaded with fiber optic cable, connectors and adapters, with fiber optic cables routed through the tray framework 101. FIG. 1 illustrates fiber optic storage area 90 with storage or wrap spools 91 and 92. FIG. 1 illustrates for instance fiber optic cable 80 which is connected to a fiber optic connector or adapter which is mounted within adapter holding recipient structure 107. One or more fiber optic cables may be routed through a fiber optic cable passageway in the adapter holder mounted within adapter holding recipient structure 104.

FIG. 1 further shows an adapter holder 82 with a first fiber optic cable 85 operatively attached or connected to the adapter or connector held by the adapter holder 82 on its first side and a second fiber optic cable 86 operatively connected or attached to the adapter or connector held on the second side of the adapter or adapter holder 82.

The adapter holders are shown in the preferred mounting orientation and configuration, which are mounted generally longitudinally so that fiber optic cables and fiber optic connectors would be generally oriented transversely, as shown in FIG. 1. The adapter holders may be mounted in two offset configurations in the array shown, or in any one of several other offset and/or complementary configurations.

FIG. 2 is a top view of the embodiment of the invention illustrated in FIG. 1, and shows tray system 100, tray framework 101, base or framework apertures 115 and 116, the tray depth 151 and tray width 150. Apertures may be provided and preferably are provided adjacent and beneath all of the adapter holder recipient structures, although only two are specifically identified and numbered in FIG. 2. Although tray width 150 and tray depth 151 have been described above with respect to an industry standard 19-inch-wide application, other industry standard applications in various countries may also be utilized, or custom applications may also be utilized, as no one particular width or depth is necessary to practice this invention. Instead, this invention provides the ability to house more fiber optic cable adapter connections per area than others heretofore available in the industry, whether a nineteen inch, a twenty-three inch, or any other.

FIG. 3 is a detail view of the base or frame aperture 115, adapter holder recipient structure 104 and tray framework bottom or base 101e.

FIG. 4 is a top view of one embodiment of this invention, as illustrated in FIG. 1, partially slid within cabinet 200. Tray framework 101 similar to that shown in FIG. 1 is partially slid into cabinet 200.

FIG. 5 is an elevation view of one embodiment of an adapter holder 230 as contemplated by this invention, showing an adapter holder 230 configured to receive and secure or hold two fiber optic cable adapters. The adapter holder 230 illustrated in FIG. 5 is configured to receive and hold two FC-type fiber optic cable adapters. While the adapter holder is configured to receive one or more FC-type fiber optic cable adapters, this invention is in no way limited to any one particular type of adapter, but instead may be configured to receive and hold any of the adapters as set forth above, or any additional adapters that may become available for use.

A first adapter mount area 231 has a width 266 of preferably less than or equal to the width of the FC-type adapter it is configured to receive and hold (to allow greater density). First alignment guide 232 and second alignment guide 233 are configured and disposed to be placed through apertures typically found in FC-type adapters and align in position the FC-type adapter on the adapter mount area 231. Adapter mount aperture 234 is configured to allow a side of the FC-type adapter to protrude through the aperture 234 so that fiber optic cables may be connected to both sides of the adapter holder 230.

FIG. 5 shows fiber optic cable passageway 235 with curved surface 236 (to provide bend radius protection), second adapter mount area 238 being located on the other side of fiber optic passageway 235. First adapter mount area 231 includes resilient members or latches 242 and 245 which are more fully shown in FIG. 6 and which are configured to help retain adapters mounted in adapter mount area 231. Second adapter mount area 238 includes first alignment guide 239 and second alignment guide 240, adapter mount aperture 241 and adapter resilient means or latches 243 and 244.

The fiber optic cable passageway 235 is utilized to provide a passageway for fiber optic cables attached to adapters held by others of the plurality of adapter holders. For instance, as better shown in FIG. 2, fiber optic cables attached to adapters mounted to adapter holder recipient structure 107 may be routed through the fiber optic passageway and the adapter holder mounted in adapter holder recipient structure 104 so that the fiber optic cables may be routed toward the second side of the tray framework 101d. The relative configuration of adapter holders vis-a-vis one another allows a density of fiber optic adapters not heretofore achieved in an industry which is seeking higher and higher density, especially in combination with a splice housing 110, (although not restricted or limited thereto).

While FIG. 5 illustrates an adapter holder for an FC-type adapter, which has apertures, other types of adapters do not have apertures and the adapter holder would typically then only utilize the aperture. Other adapters such as the SC are configured to slide into an aperture and secure themselves within the appropriately sized and configured aperture, via resilient members and in other ways.

FIG. 6 is a side view of the embodiment of the adapter holder illustrated in FIG. 5, showing adapter holder 230, latches 242 and 245, alignment guides 232 and 233, and bend radius lip 236.

FIG. 7 is a perspective view of an adapter holder recipient structure 280, illustrating base 291, attachment rivets 282, side guides 283 (which may, but need not be, resilient) with grooves 284 and latch 285. Aperture 286 provides an aperture which would be adjacent to a tray framework aperture such as aperture 115 in FIG. 2 to allow access through tray framework 101 and through adapter holder recipient structure aperture 286.

The adapter holders may be slidably placed or mounted within adapter holder recipient structure 280 by sliding opposing sides within groove 284 and thereby securing the adapter holders within the adapter holder recipient structure via latches 285. The side structures 283 may, but need not be, resilient, to allow the adapter holders to be removed from the adapter holder recipient structure 280.

FIG. 8 is a side view of the adapter holder recipient structure illustrated in FIG. 7 and shows how the adapter holders may preferably be mounted at a mount angle 281 relative to the bottom or base of tray framework, by angle 281. Mount angle 281 shows an angle of approximately 6 degrees from a perpendicular line or plane from tray framework base 101e (shown in prior figures), although the invention is not limited to any one particular angle. FIG. 8 further illustrates base 291, groove 284, latch 285 of adapter holder recipient structure 280. FIG. 8 is the view shown as 8—8 in FIG. 7.

The mount angle 281 better facilitates or allows for the sliding movement upward of the adapter holder without adverse distortion of the cable that routes through the fiber optic cable passageways in nearby and corresponding adapter holders. No one particular angle is required by this invention, but angles as high as thirty degrees may be preferred, although greater angles up to forty five degrees may be utilized. The angle 281 shown in approximately ninety-seven degrees, making angle 77 approximately seven degrees.

FIG. 9 is a top view of one embodiment of spool 111 which may be utilized in a fiber optic cable bend radius protection system which may be utilized with this invention in the tray, illustrating the guide framework with first transverse flange 334 with outward edge 335 and inner framework 329. First grooming flange 330 includes curved surface 331 which when spool 111 is rotated, is disposed above a fiber optic cable passageway and tends to groom, push or move the fiber optic cables in the passageway downward back into the passageway, or opening over which it is disposed. Second groom flange 332 likewise acts to maintain the fiber optic cables in the desired or predetermined fiber optic cable passageway when spool 111 is rotated.

FIG. 10 is an elevation view of the embodiment of the spool 111 (illustrated in FIG. 10), showing guide framework with first grooming flange 330, second grooming flange 332, first transverse flange 334 with the flanged surface 334a and outward edge 335. The bottom outward portion 338 of first transverse flange 334 would be located in a groove provided by a base as explained and shown more fully below. FIG. 10 also illustrates an outwardly facing curve surface 333 of the spool 111 which provides a surface against which fiber optic cables may be routed and bend radius thereby maintained. Although FIG. 10 does not illustrate, there is preferably a curved surface between the flanged surface 334a and the outwardly facing curve surface 333 to further protect fiber optic cables routed there-against.

FIG. 11 is a bottom view of the spool 111 with guide framework and illustrates the bottom outward surface 338 of first transverse flange 334, with outward edge 335. The first transverse flange bottom surface would preferably insert into a groove within a base at a bias force or pressure to force outward edge 335 against a side surface to prevent fiber optic cables from being pinched between the two structures which would be interconnected.

FIG. 12 shows a splice housing, but which may also be a storage housing. Shown are structure within splice housing 110, base 347 with first groove 350, passageway 348 and inwardly facing surface 349. Fiber optic cables may be routed through fiber optic cable passageway 348 with the inwardly facing surface 349 acting as an inward guide and providing bend radius protection in combination with outwardly facing curve surface 343 as illustrated in FIG. 10. First groove 350 provides the recessed area into which first transverse flange 334 may be inserted (as shown in prior figures). Resilient latches 351 shown in FIG. 12 may impart an outward and downward force on ledge 333 of spool 111 (shown in prior figures) to place a bias force on spool 111 preferably into a groove. The placement of the bias force on the outward edge 335 (shown in FIG. 10) serves to prevent fiber optic cables of any diameter from being inadvertently pinched or caught between components.

FIG. 12 further illustrates second groove 360 with base surface 360b and latches 361. First outward edge 350a of first groove 350 is typically at an angle as will be shown more fully in later figures, and is the surface against which the outward edge of the tray framework 111 would be applied to provide protection to the fiber optic cables. The base 360b of groove 360 provides a downward surface as does base 350b of first groove 350.

The splice housing illustrated in FIG. 12 may be utilized in combination with the tray as shown pivotally attached in FIG. 1 as item 110.

FIG. 13 is section view 13—13 from FIG. 12 and illustrates latch 351, groove 350 with first outward edge 350a to groove 350. Groove 350 is configured to receive a guide framework 111 such as that shown in FIG. 9, and latches such as latch 351 are configured to impart a downward force on an outer edge of the guide framework first transverse flange to assure fiber optic cables do not become pinched or trapped between components.

As will be appreciated by those of reasonable skill in the art, there are numerous embodiments to this invention, and variations of elements and components which may be used, all within the scope of this invention.

One embodiment of this invention for example involves a fiber optic cable connector tray system comprising: a tray framework with a first end, a second end, a first side and a second side; a plurality of adapter holders mounted generally longitudinally to the tray framework, the plurality of adapter holders each comprising: a first adapter mount area configured to receive a first adapter; a second adapter mount area configured to receive a second adapter; and a fiber optic cable passageway between the first adapter mount area and the second adapter mount area.

There are multiple additional combinations, specifications and/or variations which may be made with the foregoing embodiment, such as: wherein the plurality of adapter holders are configured to receive at least sixteen FC-type adapters or even twenty-four FC-type adapters in an industry standard rack unit for a nineteen inch rack.

Another embodiment is wherein the first adapter mount area and the second adapter mount area further comprise: an alignment guide disposed to insert into an aperture in an FC-type adapter when the FC-type adapter is mounted to the adapter mount area; and a latch configured to secure a first FC-type adapter to the first adapter mount area, and a second latch configured to secure a second FC-type adapter to the adapter holder.

Other embodiments of the invention may include: a combination in which the plurality of adapter holders are slidably mounted to the tray framework; or a configuration in which the tray system comprises a plurality of base apertures in the base of the tray framework corresponding and adjacent to the plurality of adapter holders, the plurality of base apertures providing access to the plurality of adapter holders through the base.

In a preferred embodiment or configuration, the fiber optic cable adapter holders may be mounted at a mount angle less than ninety degrees relative to a base of the tray framework, with a preferred range being less than ten degrees. The angle helps minimize the displacement of the fiber optic cables through passageways of other adapter holders when adapters are accessed.

In another embodiment or combination, there may be a cable storage area on the tray framework, the cable storage area being generally transversely oriented, which would generally be from the first side to the second side of the tray framework. A still further embodiment may include a splice housing mounted to the tray framework above the cable storage area, including wherein the splice housing is pivotally mounted to the tray framework above the cable storage area.

In the embodiment in which there is a fiber storage area, a splice housing, or both, this invention still achieves a higher density in an industry standard nineteen inch rack, such as wherein the plurality of adapter holders are configured to receive at least eight FC-type adapters, or at least twelve FC-type adapters.

Some embodiments of this invention are able to provide the higher density due to the non-linear nature of the array and by offsetting some of the plurality of adapters from others in more than one non-linear or even linear arrays.

Embodiments achieving some of the highest densities may involve a first of the plurality of fiber optic cable adapter holders mounted to the tray framework offset from a second of the plurality of adapter holders, and disposed such that a fiber optic cable attached to an adapter on the first of the plurality of adapter holders passes through the passageway on the second of the plurality of adapter holders.

Further embodiments achieving higher densities may include a third of the plurality of fiber optic cable adapter holders mounted to the tray framework offset from a fourth of the plurality of adapter holders, and disposed such that a fiber optic cable attached to an adapter on the third of the plurality of adapter holders passes through the passageway on the fourth of the plurality of adapter holders.

Still further high density embodiments may include a fifth of the plurality of fiber optic cable adapter holders mounted to the tray framework offset from a sixth of the plurality of adapter holders, and disposed such that a fiber optic cable attached to an adapter on the fifth of the plurality of adapter holders passes through the passageway on the sixth of the plurality of adapter holders.

In another embodiment of this invention, a fiber optic cable connector tray may be comprised of: a tray framework with a first end, a second end, a first side and a second side; a plurality of adapter holders mounted generally longitudinally to the tray framework, the plurality of adapter holders each comprising: a first adapter mount area configured to receive a first adapter, the first adapter mount area including an alignment guide disposed to insert into an aperture in the first adapter when the adapter is mounted to the framework; a second adapter mount area configured to receive a second adapter, the second adapter mount area including an alignment guide disposed to insert into an aperture in the second adapter when the adapter is mounted to the framework; a first latch configured to secure the first adapter to the first adapter mount area, and a second latch configured to secure the second adapter to the framework; and a fiber optic cable passageway between the first adapter mount area and the second adapter mount area; wherein a first one of the plurality of adapter holders is mounted offset from a second one of the plurality of adapter holders, and disposed such that a fiber optic cable connected to the first one of the plurality of adapter holders may be routed through the fiber optic cable passageway of the second one of the plurality of adapter holders. This embodiment may or may not also further comprise a plurality of tray framework apertures adjacent the plurality of fiber optic cable adapter holders mounted to the tray framework, and through which the adapter holders may be accessed from below the framework; or still further wherein the fiber optic cable adapter holders are mounted at an angle relative to a plane perpendicular to the framework (including wherein the angle is less than ten degrees).

In another embodiment of this invention, a fiber optic cable adapter holder may be comprised of: a first adapter mount area configured to receive a first FC-type adapter, the first adapter mount area including an alignment guide disposed to insert into an aperture in the first FC-type adapter when the adapter is mounted to the framework; a second adapter mount area configured to receive a second FC-type adapter, the second adapter mount area including an alignment guide disposed to insert into an aperture in the second FC-type adapter when the adapter is mounted to the framework; and a first latch configured to secure the first FC-type adapter to the first adapter mount area, and a second latch configured to secure the second FC-type adapter to the framework; and a fiber optic cable passageway between the first adapter mount area and the second adapter mount area.

Another embodiment of this invention may include a fiber optic cable adapter holder for use in combination with an FC adapter, the adapter holder comprised of: a first adapter mount area on the framework configured to receive a first FC-type adapter, the first adapter mount area including an alignment guide disposed to insert into an aperture in the first FC-type adapter when the adapter is mounted to the framework; a first latch configured to secure the first FC-type adapter to the first adapter mount area; and wherein the holder framework has a width which is less than or equal to the FC-type adapter width.

This embodiment may be further combined so as to include a second adapter mount area on the holder framework configured to receive a second FC-type adapter abutting the first adapter, the second adapter mount area including an alignment guide disposed to insert into an aperture in the second FC-type adapter when the adapter is mounted to the framework; and wherein the holder framework has a width which is less or equal to the first FC-type adapter and the second FC-type adapter abutted together.

The embodiment referenced above may also be configured such that the holder framework is further comprised of: a second adapter mount area on the framework configured to receive a second FC-type adapter, the second adapter mount area including an alignment guide disposed to insert into an aperture in the second FC-type adapter when the adapter is mounted to the framework; a fiber optic cable passageway between the first adapter mount area and the second adapter mount area; and wherein the holder framework has a width which is less than or equal to the sum of widths of the first FC-type adapter, the second FC-type adapter and the fiber optic cable passageway.

Another embodiment of this invention may be a fiber optic cable adapter holder comprised of: a first adapter mount area configured to receive a first FC-type adapter, the first adapter mount area including an alignment means to position the first FC-type adapter when it is mounted to the framework; a second adapter mount area configured to receive a second FC-type adapter, the second adapter mount area including an alignment means to position the second FC-type adapter when it is mounted to the framework; and a first attachment means to secure the first FC-type adapter to the first adapter mount area, and a second attachment means to secure the second FC-type adapter to the framework. In this embodiment, there may be a fiber optic cable passageway between the first adapter mount area and the second adapter mount area.

Embodiments of this invention as recited above, and others, may also be combined with a cabinet which includes with an internal cavity and which is configured to slidably receive the tray framework.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A fiber optic cable connector tray system comprising:
   a tray framework with a first end, a second end, a first side and a second side;
   a plurality of fiber optic cable adapter holding structures mounted to the tray framework such that fiber optic connectors therein would be in a generally transverse orientation from the first side to the second side of the tray framework, the plurality of fiber optic cable adapter holding structures each comprising:
   a first adapter mount area configured to receive a first adapter;
   a second adapter mount area configured to receive a second adapter; and
   a fiber optic cable passageway between the first adapter mount area and the second adapter mount area.

2. A fiber optic cable connector tray system as recited in claim 1, and further wherein the plurality of adapter holding structures are configured to receive at least sixteen FC-type adapters.

3. A fiber optic cable connector tray system as recited in claim 1, and further wherein the plurality of adapter holding structures are configured to receive at least twenty-four FC-type adapters.

4. A fiber optic cable connector tray system as recited in claim 1, and further comprising a cabinet with an internal cavity configured to slidably receive the tray framework.

5. A fiber optic cable connector tray system as recited in claim 1, and further wherein the first adapter mount area and the second adapter mount area further comprise:
   an alignment guide disposed to insert into an aperture in an FC-type adapter when the FC-type adapter is mounted to the adapter mount area; and a latch configured to secure a first FC-type adapter to the first adapter mount area, and a second latch configured to secure a second FC-type adapter to the adapter holding structure.

6. A fiber optic cable connector tray system as recited in claim 1, and further wherein the plurality of adapter holding structures are slidably mounted to the tray framework such that they may be slid in a direction away from a base of the tray framework.

7. A fiber optic cable connector tray system as recited in claim 6, and further wherein the tray system comprises a plurality of base apertures in the base of the tray framework corresponding and adjacent to the plurality of adapter holding structures, the plurality of base apertures providing access to the plurality of adapter holding structures through the base.

8. A fiber optic cable connector tray system as recited in claim 1, and further wherein the fiber optic cable adapter holding structures are mounted at a mount angle less than ninety degrees relative to a base of the tray framework.

9. A fiber optic cable connector tray system as recited in claim 8, and wherein the mount angle is less than ten degrees.

10. A fiber optic cable connector tray system as recited in claim 1, and further comprising a cable storage area on the tray framework, the cable storage area being generally transversely oriented from the first side to the second side of the tray framework.

11. A fiber optic cable connector tray system as recited in claim 10, and further comprising a splice housing mounted to the tray framework above the cable storage area.

12. A fiber optic cable connector tray system as recited in claim 11, and further wherein the splice housing is pivotally mounted to the tray framework above the cable storage area.

13. A connector tray system as recited in claim 9, and further wherein the plurality of adapter holding structures are configured to receive at least eight FC-type adapters.

14. A fiber optic cable connector tray system as recited in claim 9, and further wherein the plurality of adapter holding structures are configured to receive at least twelve FC-type adapters.

15. A fiber optic cable connector tray system as recited in claim 1, and further wherein the plurality of fiber optic cable adapter holding structures are mounted to the tray framework in a non-linear array.

16. A fiber optic cable connector tray system as recited in claim 1, and further wherein a first of the plurality of fiber optic cable adapter holding structures is mounted to the tray framework offset from a second of the plurality of adapter holding structures, and disposed such that a fiber optic cable attached to an adapter on the first of the plurality of adapter holding structures passes through the passageway on the second of the plurality of adapter holding structures.

17. A fiber optic cable connector tray system as recited in claim 16, and further wherein a third of the plurality of fiber optic cable adapter holding structures is mounted to the tray framework offset from a fourth of the plurality of adapter holding structures, and disposed such that a fiber optic cable attached to an adapter on the third of the plurality of adapter holding structures passes through the passageway on the fourth of the plurality of adapter holding structures.

18. A fiber optic cable connector tray system as recited in claim 16, and further wherein a fifth of the plurality of fiber optic cable adapter holding structures is mounted to the tray framework offset from a sixth of the plurality of adapter holding structures, and disposed such that a fiber optic cable attached to an adapter on the fifth of the plurality of adapter holding structures passes through the passageway on the sixth of the plurality of adapter holding structures.

19. A fiber optic cable connector tray comprised of:
   a tray framework with a first end, a second end, a first side and a second side;
   a plurality of fiber optic cable adapter holding structures mounted to the tray framework, the fiber optic adapter holding structures being mounted such that fiber optic connectors therein would be in a general orientation from the first side to the second side fo the tray framework and including an adapter holding structure comprised of:
   a first adapter mount area configured to receive a first adapter, the first adapter mount area including an alignment guide disposed to insert into an aperture in the first adapter when the adapter is mounted to the framework;
   a second adapter mount area configured to receive a second adapter, the second adapter mount area including an alignment guide disposed to insert into an aperture in the second adapter when the adapter is mounted to the framework;
   a first latch configured to secure the first adapter to the first adapter mount area, and a second latch configured to secure the second adapter to the framework; and
   a fiber optic cable passageway between the first adapter mount area and the second adapter mount area;
   wherein a first one of the plurality of adapter holding structures is mounted offset from a second one of the plurality of adapter holding structures, and disposed such that a fiber optic cable connected to the first one of the plurality of adapter holding structures may be routed through the fiber optic cable passageway of the second one of the plurality of adapter holding structures.

20. A fiber optic cable connector tray as recited in claim 19, and further comprised of a plurality of tray framework apertures adjacent the plurality of fiber optic cable adapter holding structures mounted to the tray framework, and through which the adapter holding structures may be accessed from below the framework.

21. A fiber optic cable connector tray as recited in claim 19, and further wherein the fiber optic cable adapter holding structures are mounted at an angle relative to a plane perpendicular to the tray framework.

22. A fiber optic cable connector tray as recited in claim 21, and wherein the angle is less than ten degrees.

23. A fiber optic cable adapter holding structure comprised of:
   a first adapter mount area configured to receive a first FC-type adapter, the first adapter mount area including an alignment guide disposed to insert into an aperture in the first FC-type adapter when the adapter is mounted to a holder framework;
   a second adapter mount area configured to receive a second FC-type adapter, the second adapter mount area including an alignment guide disposed to insert into an aperture in the second FC-type adapter when the adapter is mounted to the holder framework; and
   a first latch configured to secure the first FC-type adapter to the first adapter mount area, and a second latch configured to secure the second FC-type adapter to the holder framework; and
   a fiber optic cable passageway between the first adapter mount area and the second adapter mount area.

24. A fiber optic cable adapter holding structure for use in combination with an FC adapter, the adapter holding structure comprised of:
   a first adapter mount area on a holder framework configured to receive a first FC-type adapter, the first adapter mount area including an alignment guide disposed to insert into an aperture in the first FC-type adapter when the adapter is mounted to the holder framework;
   a first latch configured to secure the first FC-type adapter to the first adapter mount area;
   wherein one of the first adapter mount area and a second adapter mount area on the holder framework has a width which is less than or equal to the FC-type adapter width; and
   the second adapter mount area on the holder framework configured to receive a second FC-type adapter, the second adapter mount area including an alignment guide disposed to insert into an aperture in the second FC-type adapter when the adapter is mounted to the holder framework.

25. A fiber optic cable adapter holding structure as recited in claim 24, and wherein the holder framework is further comprised of:
   the second adapter mount area on the holder framework configured to receive a second FC-type adapter; and wherein the holder framework has a width which is less or equal to a combined width of the first FC-type adapter and the second FC-type adapter.

26. A fiber optic cable adapter holding structure as recited in claim 24, and wherein the holder framework is further comprised of
   a fiber optic cable passageway between the first adapter mount area and the second adapter mount area; and
   wherein the holder framework has a width which is less than or equal to the sum of widths of the first FC-type adapter, the second FC-type adapter and the fiber optic cable passageway.

27. A fiber optic cable adapter holding structure comprised of:
   a first adapter mount area configured to receive a first FC-type adapter, the first adapter mount area including an alignment means to position the first FC-type adapter when it is mounted to a framework;
   a second adapter mount area configured to receive a second FC-type adapter, the second adapter mount area including an alignment means to position the second FO-type adapter when it is mounted to the framework;
   a first attachment means to secure the first FC-type adapter to the first adapter mount area, and a second attachment means to secure the second FC-type adapter to the framework and
   a fiber optic cable passageway between the first adapter mount area and the second adapter mount area.

* * * * *